(12) United States Patent
Borgmann et al.

(10) Patent No.: US 7,353,853 B2
(45) Date of Patent: Apr. 8, 2008

(54) FIBER PLACEMENT MACHINE

(75) Inventors: Robert E. Borgmann, Mainville, OH (US); Don O. Evans, Milford, OH (US)

(73) Assignee: Cincinnati Machine, LLC, New York, NY (US)

( * ) Notice: Subject to any disclaimer, the term of this patent is extended or adjusted under 35 U.S.C. 154(b) by 399 days.

(21) Appl. No.: 11/120,722

(22) Filed: May 3, 2005

(65) Prior Publication Data

US 2006/0249256 A1   Nov. 9, 2006

(51) Int. Cl.
*B32B 37/00* (2006.01)

(52) U.S. Cl. ............... 156/433; 156/441; 156/574; 156/523; 156/361; 156/363

(58) Field of Classification Search ........... 156/361, 156/363, 574, 523, 433, 441
See application file for complete search history.

(56) References Cited

U.S. PATENT DOCUMENTS

| | | | |
|---|---|---|---|
| 4,068,536 A | 1/1978 | Stackhouse | |
| 4,869,774 A | 9/1989 | Wisbey | |
| 4,872,619 A | 10/1989 | Vaniglia | |
| 4,877,193 A | 10/1989 | Vaniglia | |
| 4,907,754 A | 3/1990 | Vaniglia | |
| 4,943,338 A | 7/1990 | Wisbey | |
| 5,022,952 A | 6/1991 | Vaniglia | |
| 5,110,395 A | 5/1992 | Vaniglia | |
| 5,239,457 A | 8/1993 | Steidle et al. | |
| 5,273,614 A | 12/1993 | Grimshaw et al. | |
| 5,290,389 A * | 3/1994 | Shupe et al. | 156/425 |
| 5,454,897 A | 10/1995 | Vaniglia | |
| 6,003,400 A | 12/1999 | Rauchfuss | |
| 6,096,164 A * | 8/2000 | Benson et al. | 156/425 |
| 6,994,324 B2 * | 2/2006 | Harvey et al. | 254/388 |
| 2005/0006521 A1 | 1/2005 | Harvey et al. | |

FOREIGN PATENT DOCUMENTS

WO  WO-2004/101413 A2 * 11/2004
WO  WO 2005/105415    11/2005

* cited by examiner

*Primary Examiner*—Jeff H. Aftergut
(74) *Attorney, Agent, or Firm*—Reising, Ethington, Barnes, Kisselle, P.C.

(57) ABSTRACT

A fiber placement machine has a creel that supplies a fiber band to a presser member that applies the fiber band to a tool or form. The presser member is part of a head that is attached to the creel of the machine by a wrist that provides movement about yaw, pitch and roll axes with respect to the creel. The fiber band is supplied by a fiber band delivery system that is associated with the wrist and that is characterized by a capability to twist the fiber band in two stages about the yaw axis or the roll axis.

18 Claims, 7 Drawing Sheets

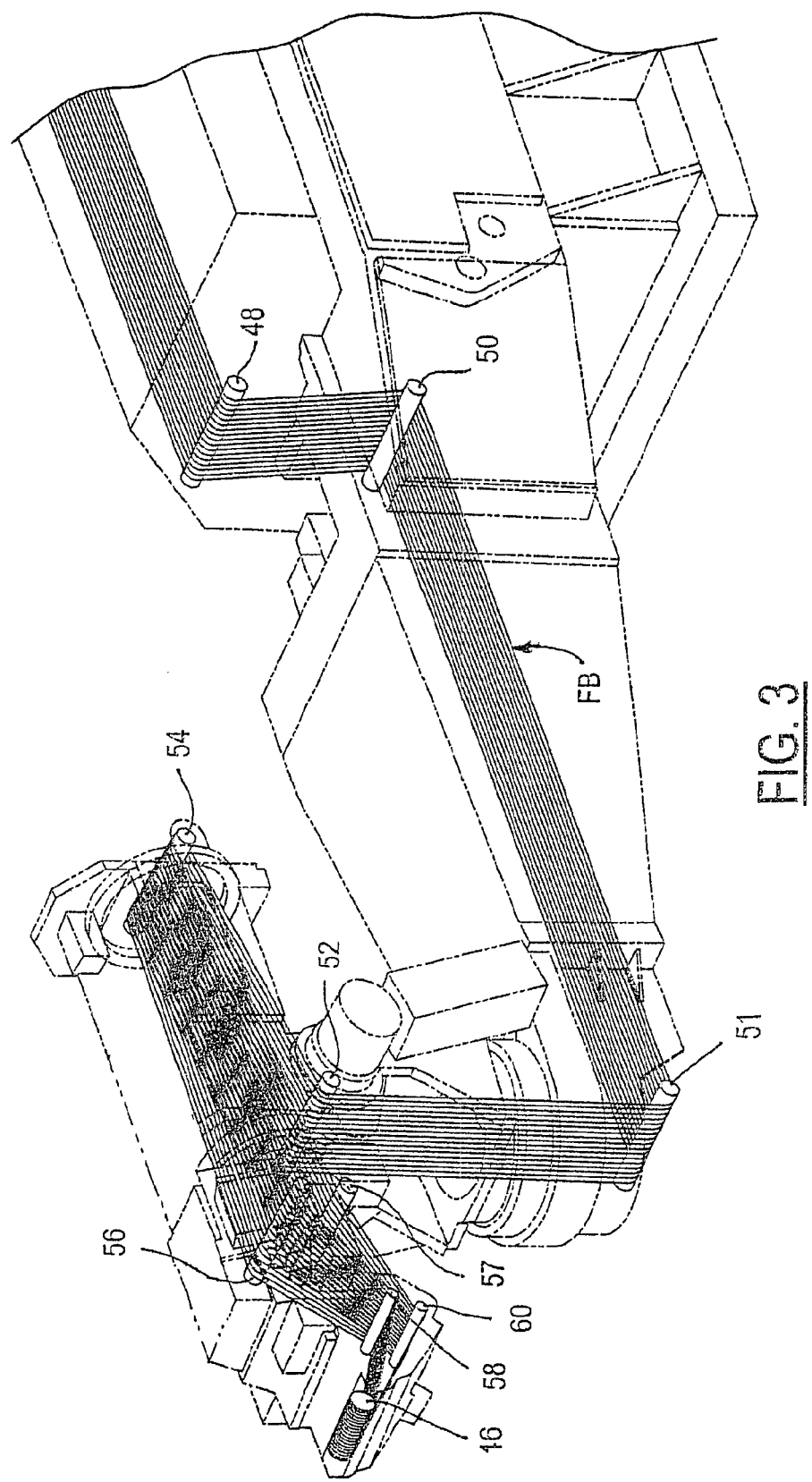

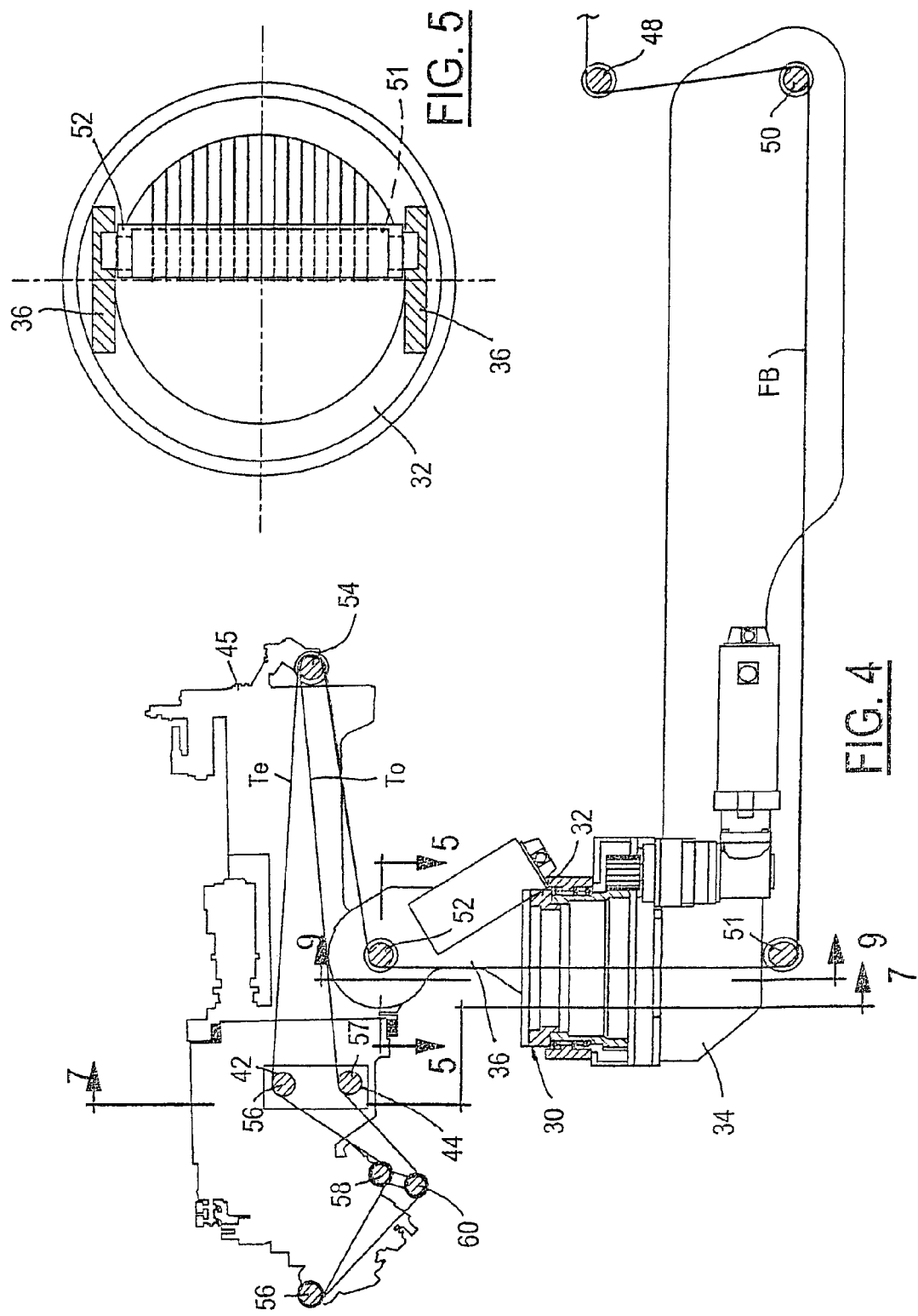

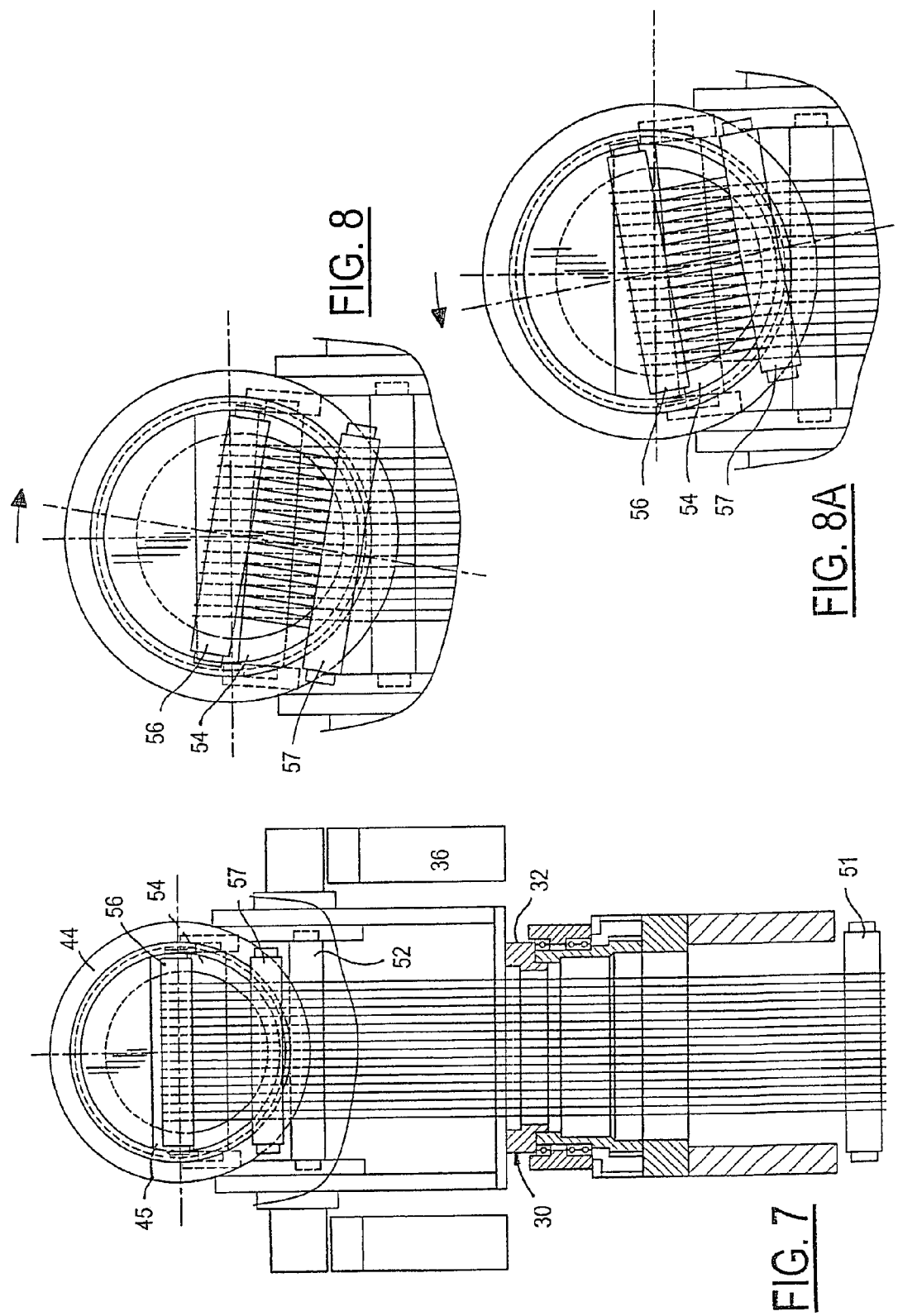

FIBER PLACEMENT MACHINE

FIELD OF THE INVENTION

This invention relates to a fiber placement machine and more particularly to a fiber placement machine having a fiber delivery system associated with a wrist of a robotic manipulator.

BACKGROUND OF THE INVENTION

The dexterity of a robotic manipulator has been defined as the ability of a manipulator to access a point in a workspace from different directions and orientations. Numerically controlled machines generally require an end effector of the manipulator to follow a specified trajectory. This trajectory requires the end effector to visit various points in Cartesian space from arbitrary directions which requires the manipulator to have six degrees of freedom, three for position and three for orientation.

In a fiber placement machine, the position of the end effector is generally provided by two slides and a forearm that either pivots or slides while the orientation of the end effector is provided by a wrist that connects a head carrying the end effector to the end of the forearm. Positioning of the head and end effector in a fiber placement machine is not difficult. However, orientation of the end effector carried by the head is difficult because the end effector that applies the fiber to a tool or form has a substantial width so that the band of fibers is twisted as it travels from the forearm to the head via the wrist. Because of this phenomenon, existing fiber placement machines have limited dexterity. This is particularly true in a fiber placement machine that lays a fiber band of tows that must be kept separate as they travel from the forearm to the head.

U.S. Pat. No. 4,872,619 granted to Milo M. Vaniglia Oct. 31, 1989 discloses a redirect apparatus of a fiber placement machine having a fiber placement head 25 that is attached to a forearm 14 by a wrist 15. The wrist 15 is a serial roll wrist that is disclosed in U.S. Pat. No. 4,068,536 granted to Theodore Hahn Stackhouse Jan. 17, 1978. A fiber band of tows is delivered from a creel assembly 24 to the fiber placement head 25 via a grooved roller 29 and two redirect rollers 30. Redirect rollers 30 are mounted on casters supported on a stationary creel bracket 31 and an outboard support bracket 32 of fiber placement head 25 respectively. The fiber band of tows is twisted between the grooved roller 29 and the first redirect roller 30 supported on the stationary creel bracket 31 and again between the two redirect rollers 30. The redirect rollers 30 may be part of assemblies 38a, 38b that include a servo-motor 403 to provide positive controlled movement to the roller assembly. See also U.S. Pat. No. 4,877,193 granted to Milo M. Vaniglia Oct. 31, 1989 and U.S. Pat. No. 4,943,338 granted to Jerry B. Wisbey et al. Jul. 24, 1990.

This arrangement has a relatively low dexterity primarily because the fiber band of tows is offset from the centers of rotation of each of the wrist axes. This offset causes the fiber band of tows to orbit the center of rotation rather than merely to twist about it, thereby increasing the angle by which the fiber band of tows deviates from perfect perpendicularity with the axis of rotation of the redirect rollers. Additionally, this arrangement requires that all three degrees of freedom through which the fiber placement head can be oriented must be accommodated by the relative position of redirect rollers 30 (mounted on stationary creel bracket 31) and redirect rollers 30 (mounted on outboard support bracket 32 on the fiber placement head 25). These two conditions together limit the range through which the wrist can be oriented without applying excessive side angle to the fiber band of tows. It can be seen that the greater the offset of the fiber band of tows from the centers of rotation, the more limited the range of orientation of the wrist will be.

U.S. Pat. No. 5,022,952 granted to Milo M. Vaniglia Jun. 11, 1991 discloses another arrangement for a fiber placement machine comprising a tiltable forearm or housing 70 that has a fiber placement head 130 attached to a rotatable arm 72 by a roll bend roll type of robotic wrist 128. A fiber band of tows 11 is delivered from a creel assembly carried by the tiltable housing 70 via a fixed position roller 136 and two tape redirect rollers 138 and 140 of the same type that are discussed above in connection with U.S. Pat. No. 4,872,619 granted to Milo M. Vaniglia Oct. 31, 1989. As indicated above, the fiber band of tows 11 is twisted between the fixed position roller 136 and the first redirect roller 138 supported on the tiltable housing 70 and again between the two redirect rollers 138 and 140. As above, the redirect rollers 138 and 140 may be part of assemblies that include a servo-motor to provide positive controlled movement to the roller assembly.

While this arrangement has been used successfully for many years this arrangement also has a relatively low dexterity primarily because the fiber band of tows is offset from the centers of rotation of each of the wrist axes. This offset causes the fiber band of tows to orbit the center of rotation rather than merely to twist about it, thereby increasing the angle by which the fiber band of tows deviates from perfect perpendicularity with the axis of rotation of the redirect rollers. Additionally, this arrangement requires that all three degrees of freedom through which the fiber placement head can be oriented must be accommodated by the relative position of redirect rollers (mounted on stationary creel bracket) and redirect rollers (mounted on outboard support bracket on the fiber placement head). These two conditions together limit the range through which the wrist can be oriented without applying excessive side angle to the fiber band of tows. It can be seen that the greater the offset of the fiber band of tows from the centers of rotation, the more limited the range of orientation of the wrist will be.

U.S. Pat. No. 5,110,395 granted to Milo M. Vaniglia May 5, 1992 discloses a fiber placement head 12 that has upper and lower idler rollers 92 and 94 that separate every other tow between a redirect roller 90 and a compaction shoe 104.

U.S. Pat. No. 5,239,457 granted to Richard L. Steidle et al Aug. 24, 1993 discloses a redirect roller control for a fiber placement machine that controls the swivel angles of the two redirect rollers that are disclosed in the fiber placement machines described above in connection with U.S. Pat. No. 4,872,619 granted to Milo M. Vaniglia Oct. 31, 1989 and U.S. Pat. No. 5,022,952 granted to Milo M. Vaniglia Jun. 11, 1991.

SUMMARY OF THE INVENTION

This invention provides a fiber placement machine having a fiber delivery system that provides high dexterity so that the fiber can be laid on highly contoured surfaces such as, for example, domes and tip-to-tip wings.

The fiber placement machine of the invention is characterized by a fiber delivery system in which the band of fibers is twisted in two stages about a yaw axis or a roll axis.

In a preferred embodiment, the band of fibers is twisted three times between a fixed forearm redirect roller and a compaction roller of the head that applies the fiber to a tool or form.

The invention is particularly advantageous in a fiber placement machine that lays a fiber band of tows that must be kept separate during travel.

BRIEF DESCRIPTION OF THE DRAWINGS

FIG. 3 is a perspective phantom view of the forearm, wrist and fiber laying head of the fiber placement machine of FIG. 1 showing the routing of the fiber band;

FIG. 4 is a side view of the forearm, wrist and fiber laying head of the fiber placement machine of FIG. 1;

FIG. 5 is a section taken substantially along the line 5-5 of FIG. 4 looking in the direction of the arrows;

FIG. 7 is a section taken substantially along the line 7-7 of FIG. 4 looking in the direction of the arrows;

FIGS. 8 and 8A are sections similar to FIG. 7 but showing the head bracket and the rear roller brackets in different roll angles.

DETAILED DESCRIPTION OF PREFERRED EMBODIMENT

Figure 1:
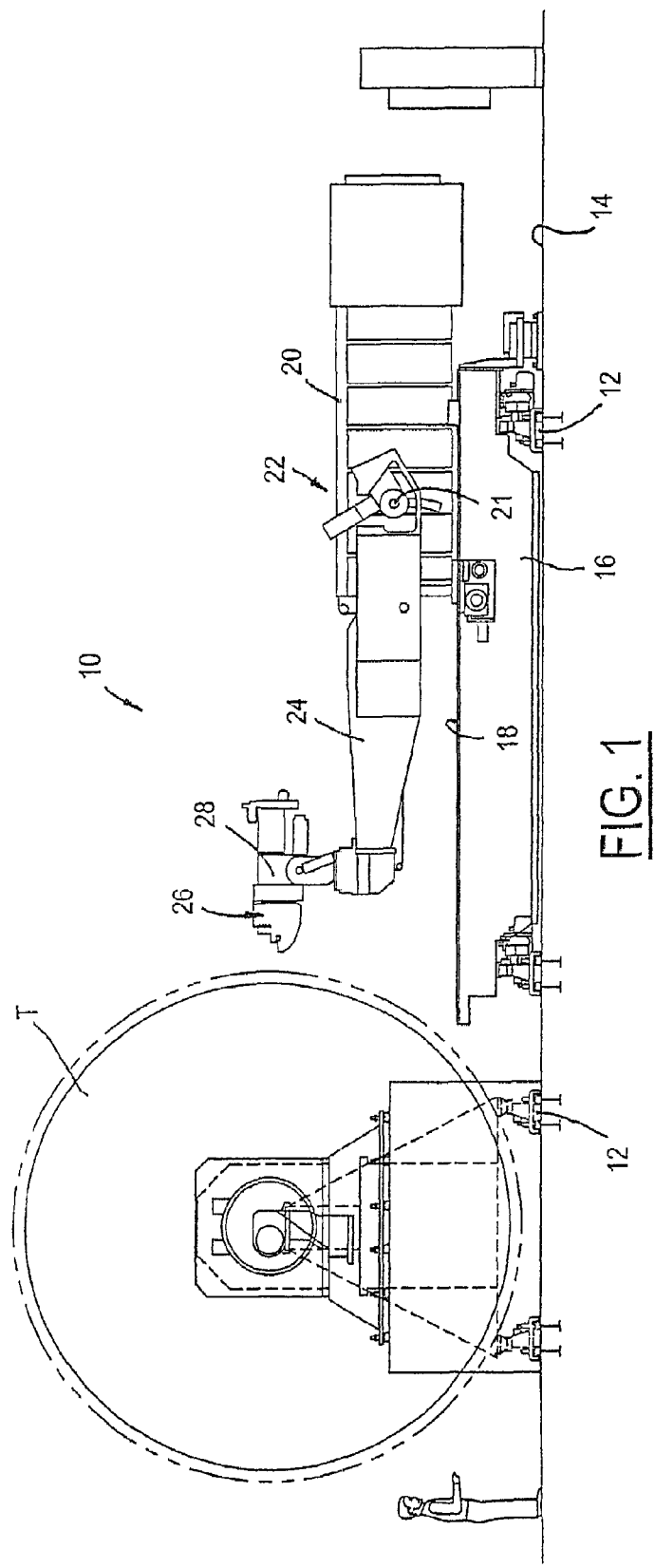
FIG. 1 is a side view of a fiber placement machine of the invention.

Referring now to FIG. 1, a fiber placement machine 10 of the invention comprises a pair of parallel carriage rails 12 mounted on a base 14 which in the case of large machines is generally a factory floor. A carriage 16 is slideably mounted on carriage rails 12 for movement parallel to a tool or form T, conventionally referred to as movement along a z axis or in a z direction in a Cartesian coordinate system that determines location with respect to base 14 primarily.

Carriage 16 in turn carries a pair of parallel cross slide rails 18 upon which is mounted a cross slide 20 for movement toward and away from the tool or form T, conventionally referred to as movement along an x axis or in an x direction in the location Cartesian coordinate system. Cross slide 20 carries a creel 22 and a tilt-type forearm 24. Forearm 24 is pivotally attached to cross slide 20 by a pivot 21 at one end so that the free end of forearm 24 moves vertically with respect to cross slide 20, the vertical movement conventionally referred to as movement along a y axis or in a y direction in the location Cartesian coordinate system. Carriage 16, cross slide 20 and forearm 24 provide a general global position location for the end of the forearm 24. Other global positioning systems can be used such as x, y and z slides where forearm 24 typically is attached to a y-slide or a z slide.

A fiber band type of fiber laying head 26 is attached to the end of forearm 24 by a "wrist" 28 that generally provides orientation of fiber laying head 26 with respect to the end of forearm 24. Wrist 28 provides three degrees of freedom for fiber laying head 26 by providing yaw, pitch and roll movements of fiber laying head 26 with respect to the end of forearm 24. As indicated in the introduction, the fiber delivery system of the machine 10 associated with the wrist provides a high dexterity that twists the fiber band at least three times as more fully explained below.

Figure 2:
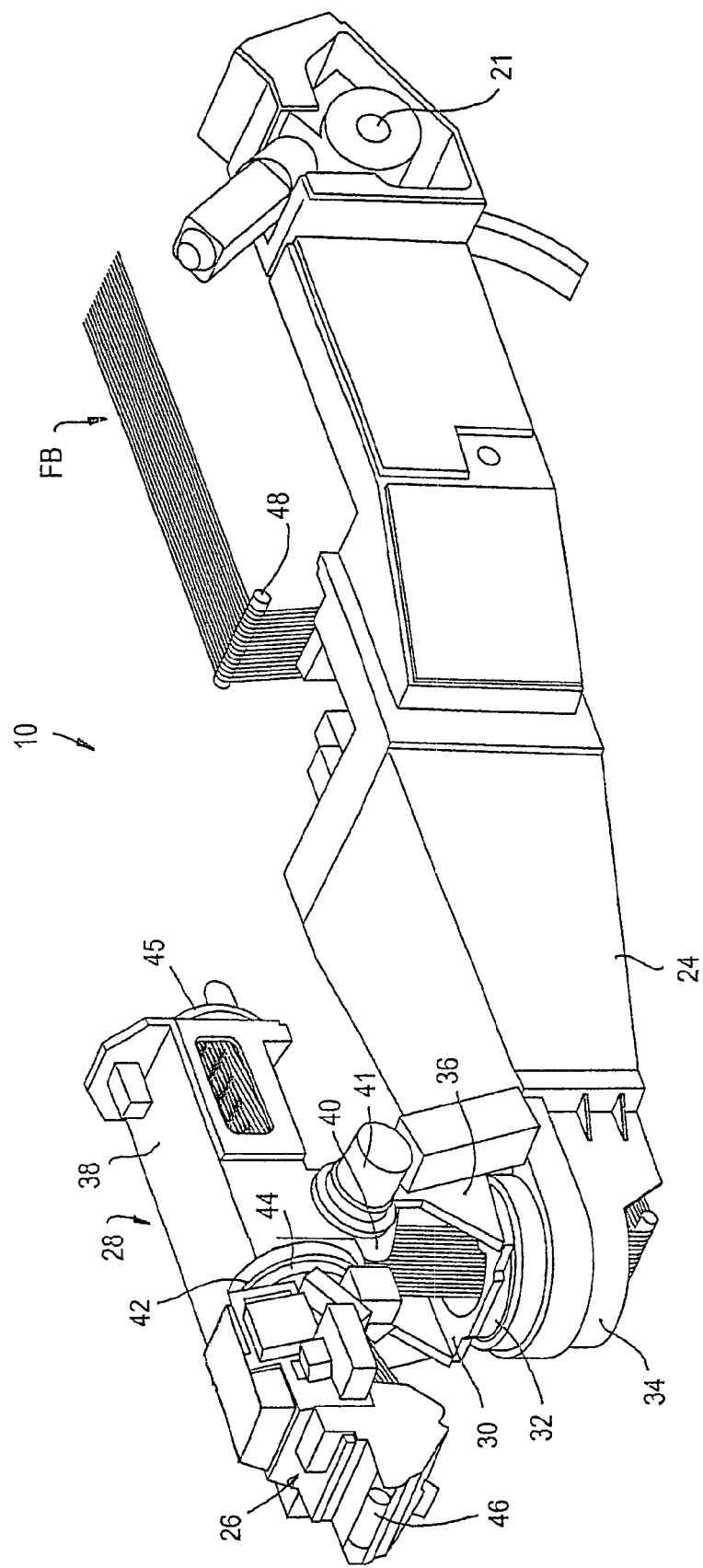
FIG. 2 is a perspective view of the forearm, wrist and fiber laying head of the tape laying machine shown in FIG. 1.

Referring now to FIGS. 2 and 3, the yaw movement (rotation about a vertical or y axis of a second orientation Cartesian coordinate system that determines orientation with respect to the end of forearm 24 primarily) of fiber laying head 26 is provided by a yaw bracket 30 comprising a yaw sleeve 32 that rotates inside a hollow annular yaw housing 34 that is attached to the end of forearm 24. Yaw bracket 30 has a yaw yoke 36 at the top of yaw sleeve 32.

The pitch movement (rotation about a lateral horizontal or z axis of the orientation Cartesian coordinate system) of fiber laying head 26 is provided by a pitch housing 38 that is pivotally attached to the yaw yoke 36 by a pitch housing yoke 40 that is secured to pitch housing 38. Yaw yoke 36 and pitch housing yoke 40 are pivotally interconnected by pivot 41.

The roll movement (rotation about a longitudinal horizontal or x axis of the orientation Cartesian coordinate system) of fiber laying head 26 is provided by a head bracket 42 that comprises a head sleeve 44 that rotates in pitch housing 38. Roll movement of fiber laying head 26 is enhanced by a rear roller bracket 45 that also rotates in pitch housing 38 as explained below. Rotation of rear roller bracket 45 in pitch housing 38 is coordinated with rotation of fiber laying head 26 in pitch housing 38 as explained below.

Fiber laying head 26 carries a compaction roller 46 that lays several tows T of a fiber band FB that originate at creel 22 onto the tool or form T. During normal operation, compaction roller 46 moves with six degrees of freedom to wrap the fiber band FB against the tool or form T. Compaction roller 46 moves in x, y and z directions in a first primarily location Cartesian coordinate system with respect to the base 14 along with carriage 16, cross slide 20 and forearm 24. Compaction roller 46 also yaws, pitches and rolls, that is, pivots about x, y and z axes in a second primarily orientation Cartesian coordinate system with respect to the end of forearm 24 although some relocation is involved unavoidably.

Figure 9:
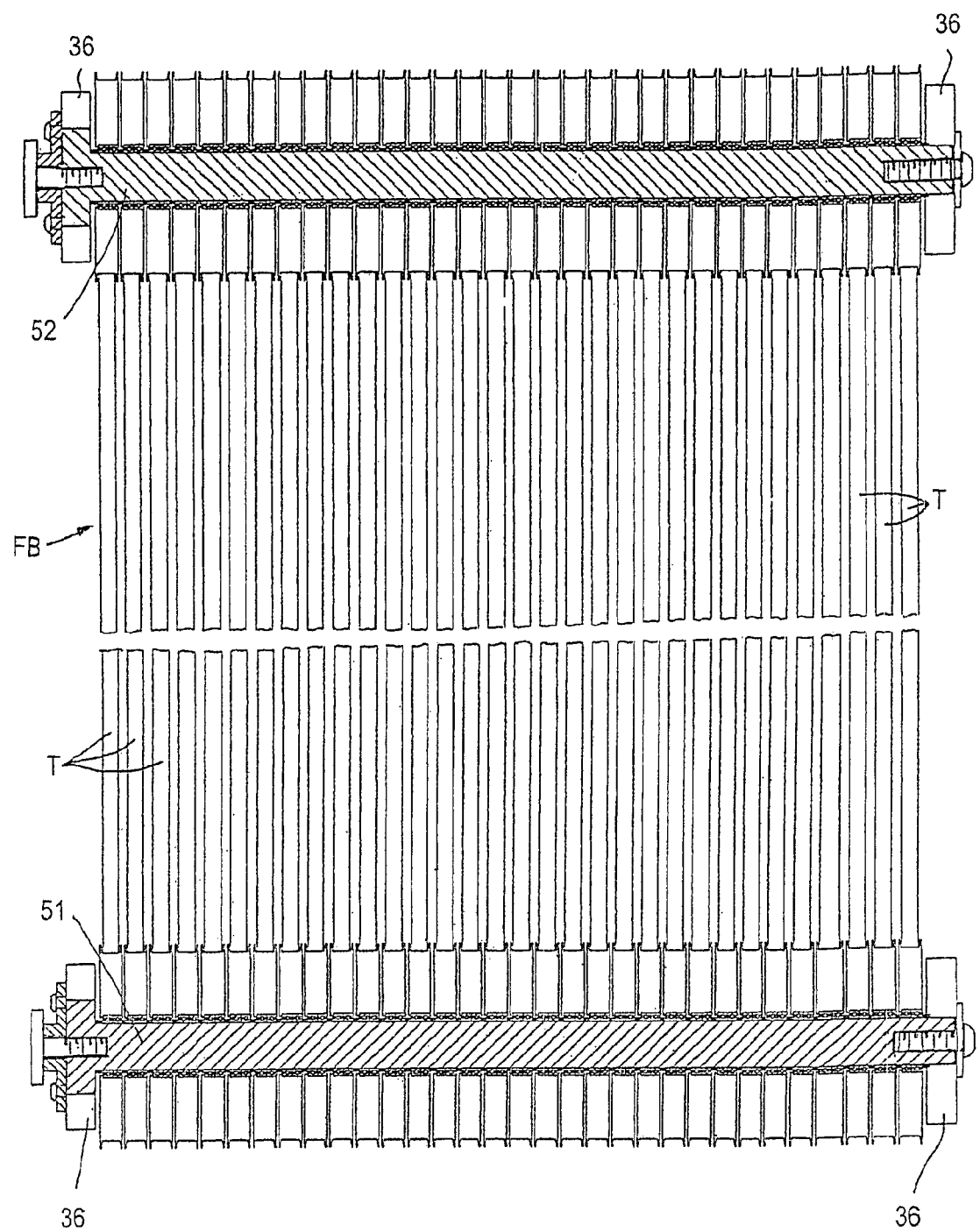
FIG. 9 is a section taken substantially along the line 9-9 of FIG. 4 looking in the direction of the arrows.

The structure and operation of a creel is well known. For instance, see U.S. Pat. No. 4,872,619 discussed above. Consequently creel 22 need not be described in detail. Suffice it to say that creel 22 produces the fiber band FB that is shown in detail in FIG. 9. Referring momentarily to FIG. 9, fiber band FB comprises a plurality of parallel, individual fiber tows T, (for example, tows of preimpregnated carbon fiber or other prepreg materials) that are spaced apart.

Referring now to FIGS. 1, 2, 3 and 4, several rollers are provided between fiber laying head 26 and creel 22 so that the sticky tows T of the fiber band FB do not touch each other as fiber band FB twists and turns between creel 22 and fiber laying head 26. The rollers are preferably of the type described in U.S. Pat. No. 4,877,193 and may include guides disclosed in U.S. Pat. No. 5,273,614. However, any suitable type of roller may be used.

Starting at creel 22 (FIG. 1), the several tows T of fiber band FB from several drums of creel 22, are trained over a fixed creel redirect roller 48. From redirect roller 48 the tows T of fiber band FB proceed down through a hollow portion of forearm 24 to redirect roller 50 (FIG. 3) which is located collinear with and situated between the pivot bearings of tiltable forearm 24. The tows T of fiber band FB are trained under redirect roller 50 and proceed beneath the tiltable forearm to its free end where tows T are trained under a fixed yaw axis redirect roller 51. Redirect roller 51 redirects tows T of fiber band FB through yaw housing 34 in a vertical or Y direction. Redirect rollers 48, 50 and 51 all rotate about axes parallel to Z-axis in the first Cartesian system that determines global positioning of the end of forearm 24.

The distances between the axes of rollers 48 and 50 and between the axes of rollers 50 and 51 preferably remain constant. The association of the fiber delivery system with wrist 28 begins at the fixed forearm or yaw axis redirect roller 51 (FIGS. 3 and 4).

Figure 6:
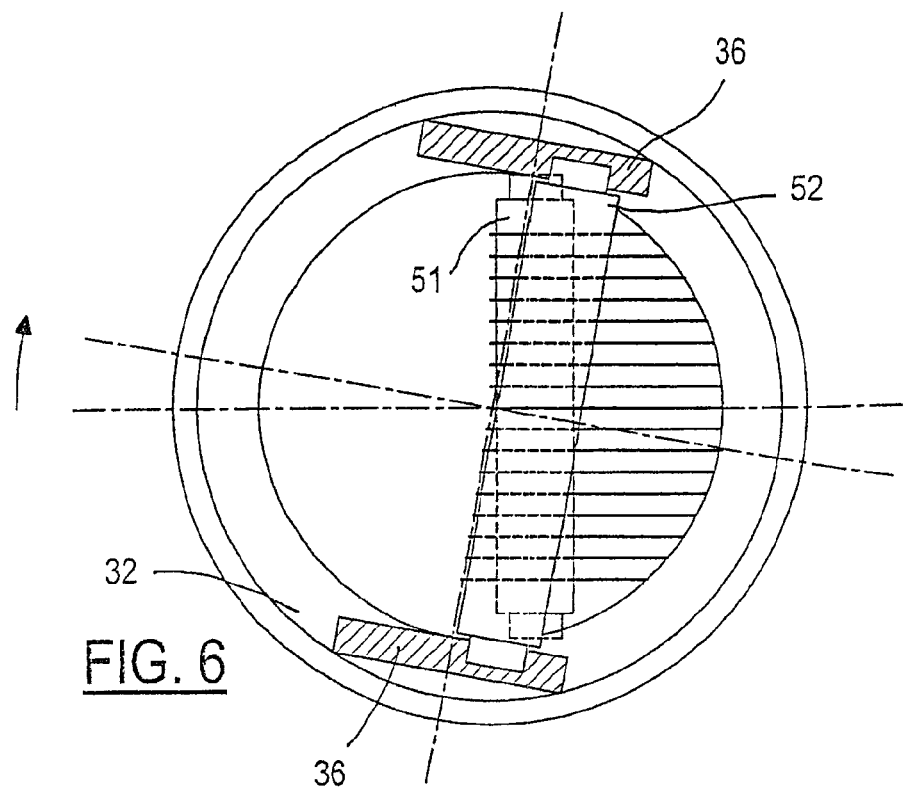
FIGS. 6 and 6A are sections similar to FIG. 5 but showing the pitch housing in different yaw angles.
Figure 6A:
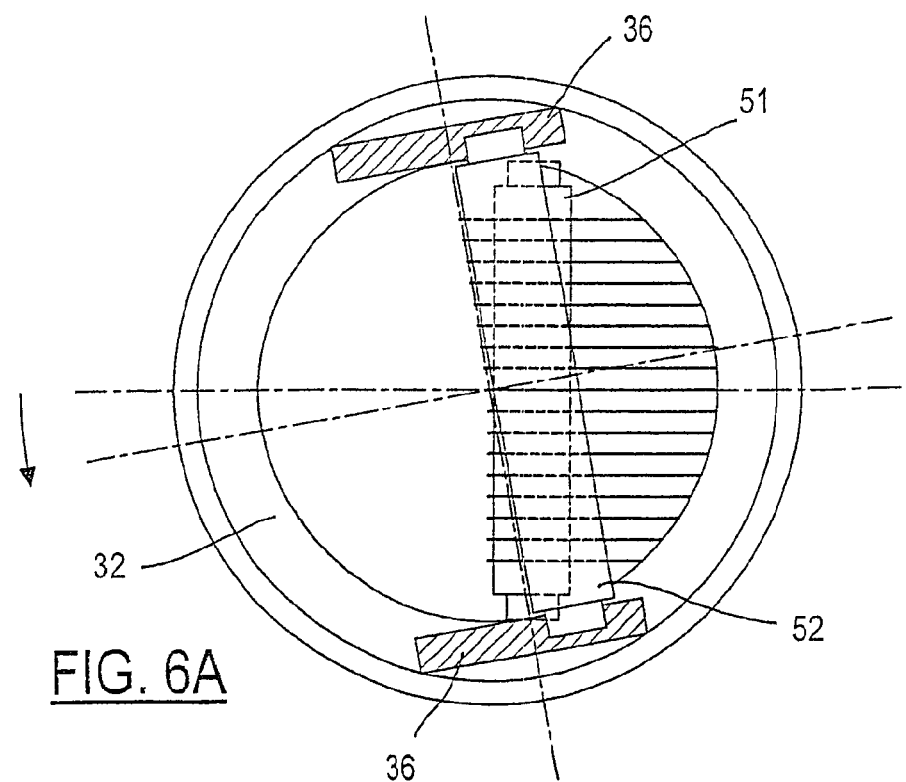

From the yaw axis redirect roller 51, the tows T of fiber band FB then proceed up and wrap over a pitch axis redirect roller 52 that rotates in bearings carried by the yaw bracket yoke 36 for rotation about a vertical yaw axis in the second orientation Cartesian coordinate system that determines the orientation of head 26 with respect to the end of forearm 24. The first twist of fiber band FB occurs between redirect roller 51 and pitch axis redirect roller 52. By way of example, in a known machine, the yaw bracket yoke 36 can rotate as much as plus or minus 95 degrees while maintaining separation of the tows T in fiber band FB. FIG. 5 shows no yaw twist at the yaw axis while FIGS. 6 and 6A show positive and negative yaw twist respectively.

From the pitch axis redirect roller 52, fiber band FB then continues rearward to a servoed redirect roller 54 at the rear end of pitch housing 38 (FIGS. 3 and 4). The servoed redirect roller 54 rotates in bearings carried by the rear roller bracket 45. Fiber band FB is trained around servoed redirect roller 54 and then proceeds forward to at least one intermediate redirect roller. However, there are preferably two intermediate redirect rollers 56 and 57 carried by the head bracket 44 and rotating in bearings carried by the pitch housing 38. Each of the redirect rollers 56 and 57 is sized to accommodate half of the total number of tows T comprising tow band FB and is located at approximately an equal distance from redirect roller 54. Redirect rollers 56 and 57 are offset vertically from one another, approximately equidistant from the center of roll rotation and rotate together. The tows T of tow band FB are divided so that the even-number tows Te are directed to the upper redirect roller 56 and the odd-number tows To are directed to the lower redirect roller 57. The servoed redirect roller 54, being rotatable on the rear roller bracket 45, rotates on an axis that rotates about a roll axis with respect to the pitch housing 38 in an imaginary plane perpendicular to the roll axis while the intermediate redirect rollers 56 and 57 being rotatable with the head bracket 44, pivot on respective parallel axes that rotate about a second roll axis in a second imaginary plane perpendicular to the second roll axis with respect to the pitch housing 38. The first and second roll axes preferably coincide with the longitudinal axis of pitch housing 38 but may be parallel to the housing and/or each other. The pitch axis redirect roller 52 rotates on an axis that is always fixed in an imaginary plane that is perpendicular to the first and second roll axes. This arrangement provides the second and third twists of fiber band FB and enhances the roll capability of fiber laying head 26 in pitch housing 38 by providing two twists that is, the second and third twists of fiber band FB between pitch axis redirect roller 52 and intermediate redirect rollers 56 and 57.

The second twist that occurs between pitch axis redirect roller 52 and servoed redirect roller 54 provides a first component of the "total roll twist" of the fiber band FB with the servo that controls rotation of the rear roller bracket 45 preferably programmed to provide about 35% of the total roll twist. The third twist that occurs between the servoed redirect roller 54 and intermediate head redirect rollers 56 and 57 provide the second component of the total roll twist or about 65% of the total roll twist. By way of example, in the known machine referenced above, the 35-65 arrangement which divides the roll twist into two components allows the fiber laying head 26 to roll as much as plus or minus 155 degrees with respect to the pitch housing 38 while maintaining separation of the tows T in fiber band FB.

FIG. 7 shows no roll twist while FIG. 8 shows a first positive roll twist between pitch axis redirect roller 52 and servoed redirect roller 54 and a second positive roll twist between servoed redirect roller 54 and head redirect roller 56. FIG. 8A shows the two roll twists in the negative direction.

The even number tows Te of fiber band FB proceed down and forward from redirect roller 56 to an upper head redirect roller 58 and the odd-number tows To proceed down and forward from redirect roller 57 to a lower head redirect roller 60 (FIGS. 3 and 4). The use of two intermediate redirect rollers 56 and 57 rather than one accommodates wider fiber bands while reducing the distance required between the intermediate redirect rollers and the head redirect rollers 58 and 59.

In the fiber laying machine 10 described above, the fiber band 54 wraps around the servoed redirect roller 54 and reverses direction. This is the preferred arrangement because it reduces the length of the pitch housing 38. However it is possible arrange the pitch axis redirect roller 52 and the intermediate head redirect roller 56 longitudinally with the servoed redirect roller 54 midway between rollers 52 and redirect rollers 56 and 57.

The fiber laying machine 10 described above uses a single twist of the fiber band FB for the total yaw twist between yaw axis redirect roller 51 and pitch axis redirect roller 52. However, it is also possible to divide the total yaw twist into two components by providing another roller that rotates on an axis that rotates with respect to the yaw axis housing 34. Such a multiple yaw twist increases the yaw capacity of the fiber band FB while maintaining separation of the taws T if more yaw is needed to meet the dexterity requirements of a particular fiber laying machine. The multiple yaw twist can then be used in combination with a single roll twist or the multiple roll twist of the fiber band FB described above. In any event, the separation of the tows T of the fiber band FG is easily maintained for pitch changes because the fiber band FB is not twisted by a pitch change. Consequently there is not any need for multiple pitch changes.

It is not intended herein to mention all the possible equivalent forms or ramification of the invention. It is understood that terms used herein are merely descriptive, rather than limiting, and that various changes may be made without departing from the spirit or scope of the invention.

We claim:

1. A fiber placement machine comprising:
   a creel for supplying a fiber band,
   a presser member for applying the fiber band to a tool or form,
   a housing,
   a second member for receiving the fiber band from the creel and delivering the fiber band to the presser member, the second member being rotatably mounted to the housing for rotation about a longitudinal axis, and
   means for twisting the fiber band in a longitudinal direction of the fiber band in stages comprising first, second and third redirect rollers for changing the direction and orientation of the fiber band as the fiber band travels from the creel to the presser member,
   the first, second and third redirect rollers being rotatable about respective first, second and third axes that are located in at least two substantially parallel planes that are substantially perpendicular to the longitudinal axis of the second member,
   the first axis being fixed with respect to the housing, the second axis being rotatable with respect to the housing and with respect to the second member, and the third axis being fixed with respect to the second member.

2. The fiber placement machine of claim 1 wherein the third redirect roller is split into two parallel split rollers and the third axis is split into two parallel axis for the respective parallel split rollers of the third roller.

3. The fiber placement machine of claim 1 wherein the housing tilts on a sleeve that rotates in a second housing, wherein the first redirect roller is at one end of the second housing, and wherein the fiber laying machine includes a fourth redirect roller at an opposite end of the second housing for twisting the fiber band between the fourth redirect roller and the first redirect roller.

4. The fiber placement machine of claim 1 wherein the first, second and third axes are located in three substantially parallel planes.

5. The fiber placement machine of claim 1 wherein the second axis is spaced longitudinally from the first axis and the third axis in a same direction.

6. The fiber placement machine of claim 4 wherein the second axis is spaced longitudinally from the first axis and the third axis in a same direction.

7. The fiber placement machine as defined in claim 1 wherein the second axis of the second redirect roller is rotated less than the third axis of the third redirect roller.

8. A fiber placement machine comprising:
a creel for supplying a fiber band,
a housing,
a fiber laying head that is rotatably mounted to the housing for receiving the fiber band from the creel and laying the fiber band onto a tool or form, and
means for twisting the fiber band in a longitudinal direction of the fiber band comprising first, second and third redirect rollers for changing the direction and orientation of the fiber band as the fiber band travels from the creel to the fiber laying head,
the first, second and third redirect rollers being rotatable about respective first, second and third axes that are located in at least two substantially parallel planes,
the first axis being fixed with respect to the housing,
the second axis being rotatable with respect to the housing and with respect to the fiber laying head, and
the third axis being fixed with respect to the fiber laying head.

9. The fiber placement machine of claim 8 wherein the third redirect roller comprises two parallel split rollers for splitting the fiber band into even and odd tows, and the third axis comprises two parallel axes for the two parallel split rollers of the third roller respectively.

10. The fiber placement machine of claim 8 wherein the first, second and third axes are located in three substantially parallel planes.

11. The fiber placement machine of claim 8 wherein the second axis is spaced longitudinally from the first axis and the third axis in a same direction.

12. A fiber placement machine comprising:
a forearm having an end that moves with three degrees of freedom,
a fiber laying head that is attached to the end of the forearm by a wrist that orients the head with three degrees of freedom with respect to the end of the forearm,
means for supplying a fiber band to the fiber laying head for laying the fiber band onto a tool or form,
the wrist including a pitch housing that is pivotally attached to the forearm; the pitch housing having a longitudinal axis,
the fiber laying head having a head bracket that comprises a head sleeve that rotates in the pitch housing and a compaction roller for laying the fiber band onto the tool or form;
the fiber band being trained over a pitch axis redirect roller at a forward end of the pitch housing that rotates about an axis located in a first redirect imaginary plane perpendicular to the longitudinal axis of the pitch housing;
the fiber band then continuing rearward to a roll redirect roller at a rearward end of the pitch housing, the roll redirect roller being rotatable about a roll redirect axis that rotates about a roll axis in a second redirect imaginary plane that is perpendicular to the longitudinal axis of the pitch housing so that the fiber band can twist between the pitch axis redirect roller and the roll redirect roller;
the fiber band being trained around roll redirect roller and then proceeding forward to an intermediate head redirect roller at the forward end of the pitch housing; and
the intermediate head redirect roller being rotatable about a head redirect axis that rotates about a second roll axis in a third redirect imaginary plane that is perpendicular to the longitudinal axis of the pitch housing so that the fiber band can twist between the roll redirect roller and the intermediate redirect roller.

13. The fiber placement machine of claim 12 wherein the rotation of the servoed redirect roller is coordinated with the rotation of the intermediate head redirect rollers.

14. The fiber placement machine of claim 12 wherein the roll axis and the second roll axis coincide with the longitudinal axis of the pitch housing.

15. A fiber placement machine having a creel that supplies a fiber band to a presser member that applies the fiber band to a tool or form, the presser member being part of a head that is attached to the creel of the machine by a wrist that provides movement about yaw, pitch and roll axes relative to the creel, the fiber band being supplied by a fiber band delivery system that is associated with the wrist and that is characterized by a capability to twist the fiber band in two stages about one of the yaw axis or the roll axis.

16. A fiber placement machine comprising:
a forearm having an end that moves with three degrees of freedom,
a fiber laying head that is attached to the end of the forearm by a wrist that orients the head with three degrees of freedom with respect to the end of the forearm,
means for supplying a fiber band to the fiber laying head for laying the fiber band onto a tool or form,
the wrist including a pitch housing that is pivotally attached to the forearm; the pitch housing having a longitudinal axis,
the fiber laying head having a head bracket that comprises a head sleeve that rotates in the pitch housing and a compaction roller for laying the fiber band onto the tool or form;
the fiber band being trained over a pitch axis redirect roller at a forward end of the pitch housing that rotates about an axis located in a first redirect imaginary plane perpendicular to the longitudinal axis of the pitch housing;
the fiber band then continuing rearward to a roll redirect roller at a rearward end of the pitch housing, the roll redirect roller being rotatable about a roll redirect axis that rotates about a roll axis in a second redirect imaginary plane that is perpendicular to the longitudinal axis of the pitch housing so that the fiber band can twist between the pitch axis redirect roller and the roll redirect roller;

the fiber band being trained around the roll redirect roller and then proceeding forward to an intermediate head redirect roller at the forward end of the pitch housing; and the intermediate head redirect roller being rotatable about a head redirect axes that rotates about a second roll axis in a third redirect imaginary plane that is perpendicular to the longitudinal axis of the pitch housing so that the fiber band can twist between the roll redirect roller and the intermediate redirect roller.

17. The fiber placement machine of claim 16 wherein the rotation of the roll redirect roller is coordinated with the rotation of the intermediate head redirect rollers.

18. The fiber placement machine of claim 16 wherein the roll axis and the second roll axis coincide with the longitudinal axis of the pitch housing.

* * * * *

UNITED STATES PATENT AND TRADEMARK OFFICE
CERTIFICATE OF CORRECTION

PATENT NO. : 7,353,853 B2
APPLICATION NO. : 11/120722
DATED : April 8, 2008
INVENTOR(S) : Borgmann et al.

It is certified that error appears in the above-identified patent and that said Letters Patent is hereby corrected as shown below:

Drawings

Figure 3, delete "16" and insert therein --46--

Specification:

Column 6, line 31 delete "taws" and insert therein --tows--
Column 6, line 36 delete "FG" and insert therein --FB--

Claims:

Please substitute the claim 12 as it appears in the issued patent with the following claim 12.

12. A fiber placement machine comprising:
 a forearm having an end that moves with three degrees of freedom,
 a fiber laying head that is attached to the end of the forearm by a wrist that orients the head with three degrees of freedom with respect to the end of the forearm,
 a creel for supplying a fiber band to the fiber laying head for laying the fiber band onto a tool or form
 the wrist including a pitch housing that is pivotally attached to the forearm; the pitch housing having a longitudinal axis,
 the fiber laying head having a head bracket that comprises a head sleeve that rotates in the pitch housing and a compaction roller that lays the fiber band that originates at the creel onto the tool or form;
 the fiber band being trained over a pitch axis redirect roller at a forward end of the pitch housing that rotates about an axis located in a first redirect imaginary plane perpendicular to the longitudinal axis of the pitch housing;
 the fiber band then continuing rearward to a servoed redirect roller at a rearward end of the pitch housing, the servoed redirect roller being rotatable about a servoed redirect axis that rotates about a roll axis in a second redirect imaginary plane that is perpendicular to the longitudinal axis of the pitch housing so that the fiber band can twist between the pitch axis redirect roller and the servoed redirect roller;

UNITED STATES PATENT AND TRADEMARK OFFICE
CERTIFICATE OF CORRECTION

PATENT NO. : 7,353,853 B2
APPLICATION NO. : 11/120722
DATED : April 8, 2008
INVENTOR(S) : Borgmann et al.

It is certified that error appears in the above-identified patent and that said Letters Patent is hereby corrected as shown below:

the fiber band being trained around servoed redirect roller and then proceeding forward to intermediate head redirect rollers at the forward end of the pitch housing; the fiber band being split into even and odd tows that are trained over the intermediate head redirect rollers respectively; and
      the intermediate head redirect rollers being rotatable about respective head redirect axes that rotate about a second roll axis in a third redirect imaginary plane that is perpendicular to the longitudinal axis of the pitch housing so that the fiber band can twist between the servoed redirect roller and the intermediate redirect roller.

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,353,853 B2 | Page 1 of 2 |
| APPLICATION NO. | : 11/120722 | |
| DATED | : April 8, 2008 | |
| INVENTOR(S) | : Borgmann et al. | |

It is certified that error appears in the above-identified patent and that said Letters Patent is hereby corrected as shown below:

Drawings

Figure 3, delete "16" and insert therein --46--

Specification:

Column 6, line 31 delete "taws" and insert therein --tows--
Column 6, line 36 delete "FG" and insert therein --FB--

Claims:

Column 7, line 59 – Column 8, line 29, please substitute the claim 12 as it appears in the issued patent with the following claim 12.

12. A fiber placement machine comprising:
   a forearm having an end that moves with three degrees of freedom,
   a fiber laying head that is attached to the end of the forearm by a wrist that orients the head with three degrees of freedom with respect to the end of the forearm,
   a creel for supplying a fiber band to the fiber laying head for laying the fiber band onto a tool or form
   the wrist including a pitch housing that is pivotally attached to the forearm; the pitch housing having a longitudinal axis,
   the fiber laying head having a head bracket that comprises a head sleeve that rotates in the pitch housing and a compaction roller that lays the fiber band that originates at the creel onto the tool or form;
   the fiber band being trained over a pitch axis redirect roller at a forward end of the pitch housing that rotates about an axis located in a first redirect imaginary plane perpendicular to the longitudinal axis of the pitch housing;
   the fiber band then continuing rearward to a servoed redirect roller at a rearward end of the pitch housing, the servoed redirect roller being rotatable about a servoed redirect axis that rotates about a roll axis in a second redirect imaginary plane that is perpendicular to the longitudinal axis of the pitch housing so that the fiber band can twist between the pitch axis redirect roller and the servoed redirect roller;

UNITED STATES PATENT AND TRADEMARK OFFICE
CERTIFICATE OF CORRECTION

PATENT NO. : 7,353,853 B2
APPLICATION NO. : 11/120722
DATED : April 8, 2008
INVENTOR(S) : Borgmann et al.

It is certified that error appears in the above-identified patent and that said Letters Patent is hereby corrected as shown below:

the fiber band being trained around servoed redirect roller and then proceeding forward to intermediate head redirect rollers at the forward end of the pitch housing; the fiber band being split into even and odd tows that are trained over the intermediate head redirect rollers respectively; and the intermediate head redirect rollers being rotatable about respective head redirect axes that rotate about a second roll axis in a third redirect imaginary plane that is perpendicular to the longitudinal axis of the pitch housing so that the fiber band can twist between the servoed redirect roller and the intermediate redirect roller.

This certificate supersedes the Certificate of Correction issued September 1, 2009.

Signed and Sealed this

Twenty-second Day of September, 2009

David J. Kappos
*Director of the United States Patent and Trademark Office*